UNITED STATES PATENT OFFICE.

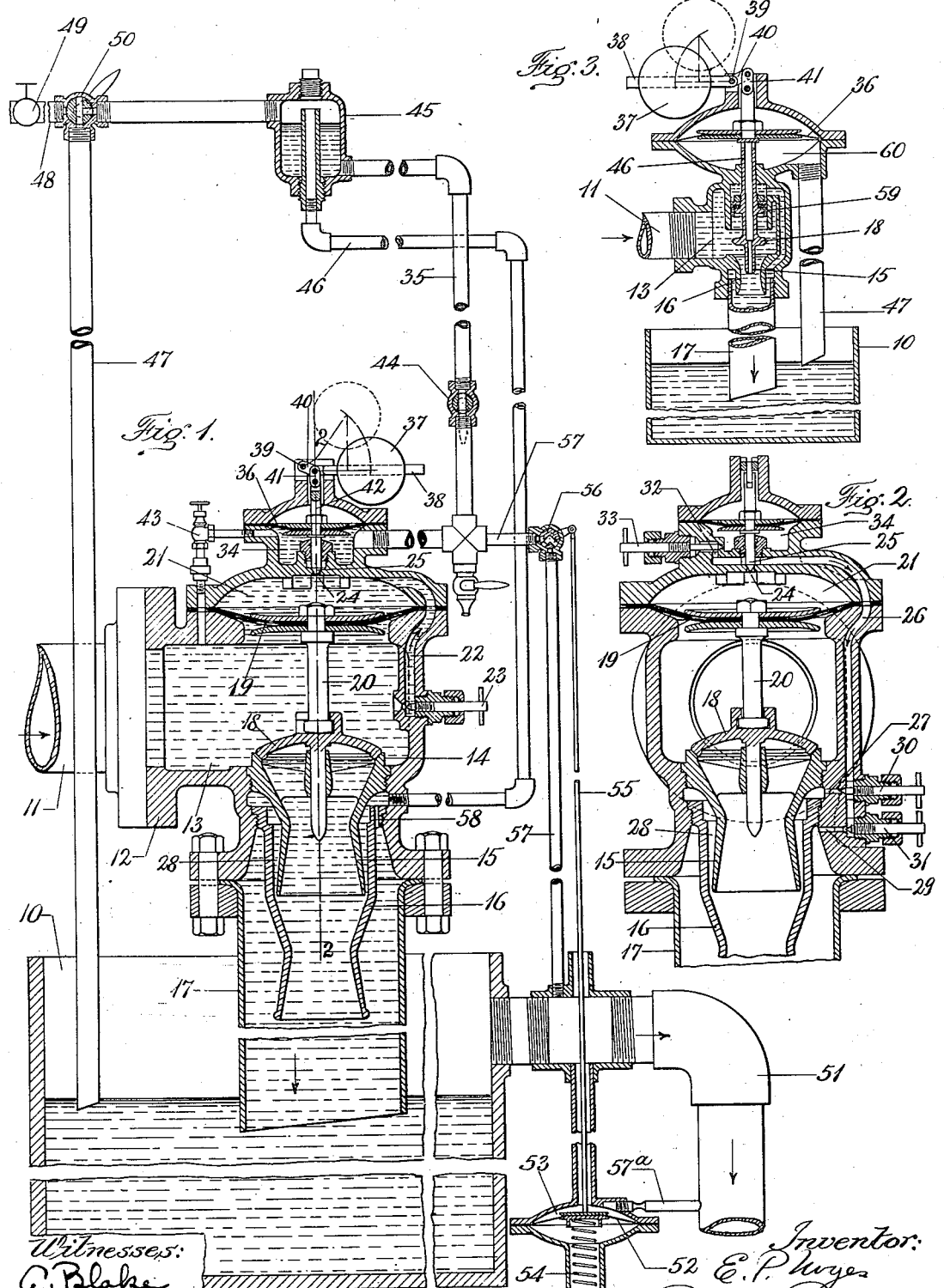

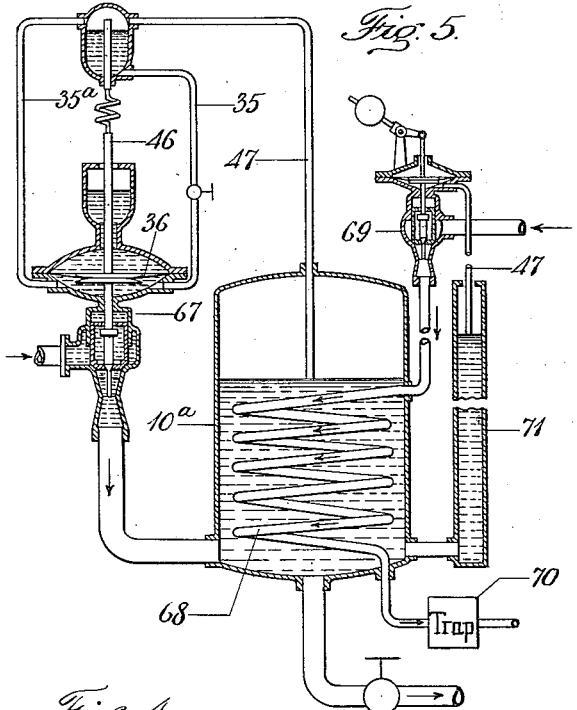
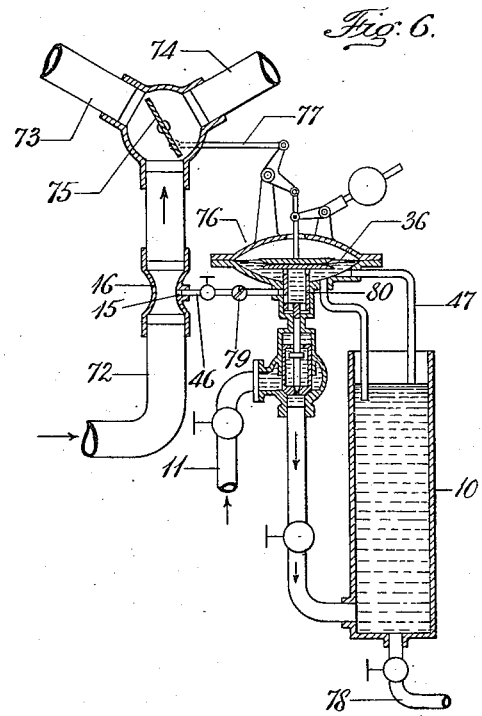
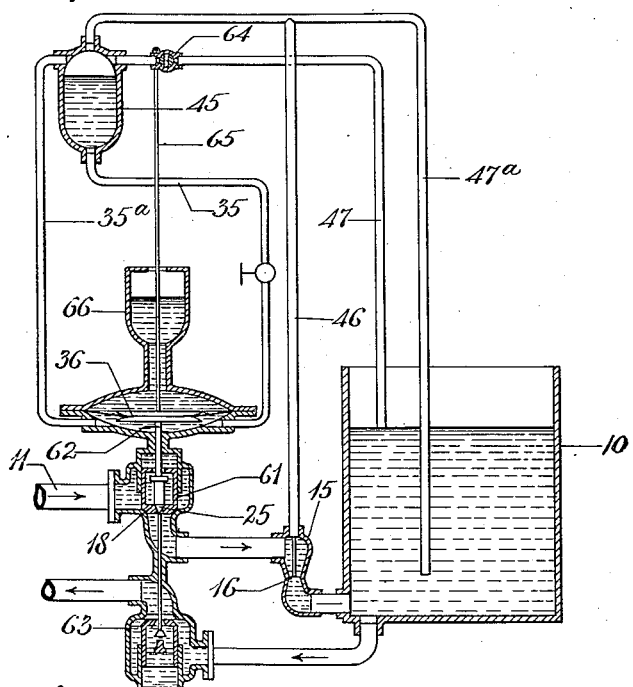
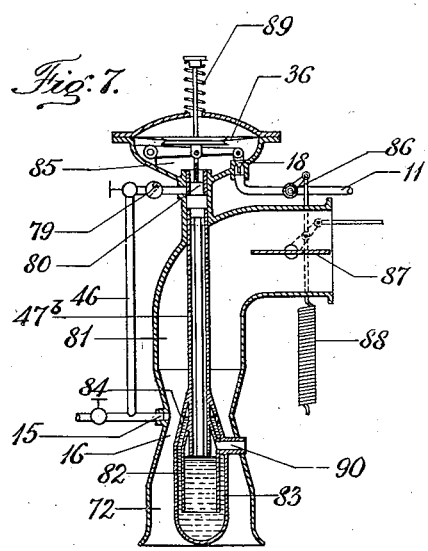

EDWARD P. NOYES, OF WINCHESTER, MASSACHUSETTS.

VACUUM-CONTROLLED DIFFERENTIAL-LIQUID-LEVEL APPARATUS.

1,076,146.   Specification of Letters Patent.   Patented Oct. 21, 1913.

Application filed December 5, 1911. Serial No. 663,970.

*To all whom it may concern:*

Be it known that I, EDWARD P. NOYES, a citizen of the United States, residing at Winchester, in the county of Middlesex and State of Massachusetts, have invented certain new and useful Improvements in Vacuum-Controlled Differential-Liquid-Level Apparatus, of which the following is a specification.

This invention mainly relates to devices such as automatic tank-feeders, traps, boiler feeders and other apparatus in which a fluctuating liquid-level is employed to control the net pressure acting upon a differentially-operated septum, for the purpose either of directly or indirectly operating a valve which controls the supply of said liquid, or of controlling some other agency.

It has been a common practice to actuate the differential septum on the one side by boiler pressure, atmospheric pressure or other substantially constant force, and on the other side by a variable elastic fluid-pressure force higher than that of the atmosphere, together usually with a weight or spring; and this requirement of a higher pressure which has prevailed except in certain special applications of steam yielding a vacuum by condensation, or where a differential liquid-head is relied upon, has somewhat restricted the uses for such apparatus.

My principal object is to enlarge the field for devices of the type mentioned, as well as to improve their construction and render their operation more certain and positive, and this I accomplish primarily by the employment of an ejector to create a partial vacuum for furnishing a variable operating force from and below the pressure of the atmosphere, in combination with suitable means for controlling this vacuum.

A further object is to furnish an improved form of apparatus including said ejector and especially adapted to the maintenance of a constant liquid level in an open tank, though also adapted in greater or less degree to other uses.

Of the accompanying drawings, Figure 1 represents a vertical sectional view of a tank-valve apparatus constructed according to my invention. Fig. 2 represents a partial section thereof in a plane at right angles to Fig. 1. Fig. 3 represents a sectional view of a simplified apparatus for the same purpose. Figs. 4, 5, 6, and 7 represent diagrammatic sectional views showing the application of the invention to other uses, Fig. 4 being an arrangement constituting a trap or liquid meter; Fig. 5 being adapted to maintain a body of liquid, which is subject to a heating agency, at a substantially constant level and temperature; Fig. 6 being an arrangement for utilizing a flow other than that of a liquid to create the differential septum-actuating force and for operating a switch-valve to control the vacuum-creating flow; and Fig. 7 being an arrangement for maintaining a constant fuel level in a carbureter.

Referring at first to Figs. 1 and 2, 10 is a tank, open to the atmosphere, in which it may be desired to maintain a substantially constant level of a liquid such as water, and 11 is the pipe for supplying said liquid. 12 is a casing having an inlet chamber 13 and a valve-seat 14 surrounding a port through which the liquid is intermittently discharged to tank 10, this discharge passing through nozzles 15, 16 constituting an ejector, and through a discharge pipe 17 surrounding the ejector and adapted to have its outlet immersed by the liquid in the tank. A valve 18 anterior to the ejector controls the discharge, and a motor septum 19 connected with the valve by a stem 20 is provided for operating the valve. The lower side of this septum is subject to the pressure in the inlet chamber 13, tending to raise and open the valve 18, and its upper side is subject to the pressure in a controlling chamber 21 having an inlet from chamber 13 by way of a duct 22 controlled by a choke valve 23. The outlet from chamber 21 occurs periodically through a port 24 controlled by a relay or pilot valve 25, and the final discharge of the controlling fluid may be to any suitable locality such as the spaces within or outside of the nozzle 16, or elsewhere.

In Fig. 2 I have shown a discharge duct 26 leading from the pilot valve and having two outlets to the discharge tube 17, one being by way of a branch 27 to the annular vacuum space 28 between the two nozzles 15, 16, and the other by way of a branch 29 to the space surrounding nozzle 16, these branches being controlled by stop-valves 30, 31. When the branch outlet 27 alone is in use, the vacuum in annulus 28 causes a rapid discharge from chamber 21 when the pilot valve 25 is opened, and the upward movement of diaphragm 19 is thereby accelerated. If branch outlet 29 alone is used, the movements of the diaphragm will be slower. The rapidity of these movements is also subject to control by means of the choke-valve 23. An alternative outlet from chamber 21 may take place by way of a duct 32 controlled by a stop-valve 33, through a chamber 34 and upwardly through a water-column pipe 35. The stem of pilot-valve 25 is connected with a pilot-diaphragm 36, to the lower side of which is applied a variable pressure transmitted to chamber 34 through the water-column in pipe 35, and on its upper or outer side the constant pressure of the atmosphere, which may if desired be supplemented by the variable pressure of a weight 37 mounted on a lever 38 which is fulcrumed at 39 and connected through a short arm 40 and a link 41 with the stem 42 of the pilot-valve. 43 is a valved by-pass leading from chamber 13 to chamber 34 for priming the latter and the water-column pipe 35. Pipe 35 contains a choke-valve 44 for controlling the rapidity of movement of valve 25. The pipe 35 ends in a pot 45, which is in operative relation with said chamber 34. The air-space of pot 45 is connected by a vacuum pipe 46 with the annular space 28 in the ejector, and by a vent pipe or dip-tube 47 with the tank 10, said vent pipe terminating in the tank at the level at which it is desired to maintain the water-line in the latter. When the lower end of this vent pipe is unsealed, any waterflow through the ejector sufficient to energize the latter simply draws air upwardly through tube 47 and down through pipe 46. When the rising water level seals the vent-pipe, a partial vacuum is created in the pot 45 as hereinafter more fully set forth.

The tank, when filled with water to or about the normal level, constitutes a preferred means for controlling the venting of pot 45, but other controlling means may be employed such as the venting branch 48 containing a stop-valve 49; 50 being a three-way cock adapted when desired to connect the pot 45 with the horizontal branch instead of the vertical branch.

51 is an overflow-pipe leading from the tank 10, and 52 is an emergency diaphragm having a chamber 53 above it open to said pipe, this diaphragm being normally elevated by a spring 54 and connected by a rod 55 with a valve 56 which controls a branch discharge-pipe 57 leading from the chamber 34 underneath the pilot diaphragm, the object of this arrangement being to reduce the water column in pipe 35 and insure the closing of the pilot valve if for any reason the tank should overflow. When the overflow ceases, valve 56 will automatically close by the relief of pressure from chamber 53 through a restricted outlet 57$^a$.

58 is a small venting duct connecting the upper end of the discharge pipe 17 with the vacuum space 28, for the purpose of preventing the formation of a vacuum in pipe 46 in case the lower end of pipe 17 should become unsealed.

In the operation of this form of my invention, the tendency of the water leg in pipe 35 and pot 45 when there is no vacuum in the latter, is to overcome the weight 37 and open pilot valve 25, thus discharging the chamber 21 and allowing the water pressure in chamber 13 to raise diaphragm 19 and open the main valve 18. The downflow of water into the tank 10 by way of discharge pipe 17 and the ejector nozzles 15, 16 causes the tank to fill and at the same time entrains air from the passage 28 and pipe 46, but so long as the mouth of the vent-pipe 47 remains uncovered the air merely circulates and no substantial vacuum is created in the pot 45. As soon as the water level has risen to seal the vent-pipe the suction caused by the ejector produces a vacuum in the air space of pot 45 and hence lessens the pressure acting underneath the diaphragm 36, the water rising in vent-pipe 47 to a height representing the amount of this partial vacuum. Weight 37 then tends to close the valve 25, and it does this with increasing force as the weight and valve descend, owing to the varying angularity of lever 38 which causes the mechanical advantage of the weight to increase as the lever approaches a horizontal position and thereby diminishes the net weighting effect of the water-column. This is in order that the weakening of the suction due to the ensuing movement of the main valve toward its seat and consequent diminution of the vacuum-causing flow shall not cause a failure of said valve to fully close. The closure of pilot valve 25 allows water pressure to accumulate in chamber 21 through the duct 22, and this produces the closure of main valve 18, thus stopping the flow of water into the tank and the suction produced by such flow. The vacuum in pot 45 will not be lost however because both the vent-pipe 47 and the discharge-pipe 17 remain sealed. When the water level in the tank has again been reduced below the end of the vent-pipe, the vacuum in pot 45 is lost, the pilot valve and main valve then reopen and reëstablish the flow of water, and the cycle of operations is repeated as above described.

The vent-pipe 47 as a separate member, while desirable, is not an essential feature, for the discharge pipe 17 may be adapted to act in the capacity of a water-level detector and vent-conduit. Thus if said pipe 17 is of sufficient diameter, it will, when its lower end is unsealed, permit the upward passage of air to the duct 58 so as to break the vacuum in passage 28 caused by the descending column of water, but as soon as the end of pipe 17 becomes sealed the air will be exhausted therefrom and the water will descend in a solid column so as to produce a vacuum in the pipe 46.

The embodiment shown in Fig. 1 includes features, such as the main and relay valves, which are especially adapted to apparatus of large size, and also by the employment of the water-column pipe 35 and its connections, it enables the working parts to be situated at a relatively low level without minimizing the available vacuum, whose maximum is partly dependent upon the height of the vent pipe. It is to be understood however that I do not limit myself to the use of a relay valve in connection with this water-column pipe interposed between a diaphragm and a chamber subject to ejector action. In case of leakage from the pipe 35 or past the diaphragm 36 the height of the water column would be reduced and closure of the main valve 18 would result, thus avoiding any flooding of the tank 10.

Fig. 3 represents a simplified embodiment which differs from Fig. 1 principally in the omission of the water-column pipe and relay features, the direct connection of the liquid-level-responsive septum to the main valve, and the reverse application of the counterbalancing weight. In this case the main valve 18 is pressure-balanced by a piston 59, and is connected directly to a diaphragm 36 having a chamber 60 below it connected with a dip-tube 47, the upper side of said diaphragm being subject to atmospheric pressure. The ejector is constituted by a fixed nozzle 16 forming an outlet from chamber 13, and a nozzle 15 carried by the main-valve structure, whose stem 46 constitutes a vacuum pipe communicating with chamber 60. Normally the weight of the valve structure is overcome by the counterbalancing weight 37, whose lever 38 in this instance is fulcrumed at 39 between its ends and causes the weight to act directly with decreasing mechanical advantage as the valve 18 goes toward closure, thereby contributing to the positive closure of said valve in the face of a diminution in the vacuum-causing flow. With the valve 18 open and dip-tube 47 unsealed, the flow of water into tank 10, causing suction through the nozzle 15, produces a flow of air which is merely entrained by the water current, but as soon as the level has risen to cover the end of tube 47, a vacuum is produced in chamber 60, and the atmospheric pressure acting above diaphragm 36 then becomes sufficient to overcome the net effect of weight 37 and close the valve 18, the latter remaining closed until the dip-tube becomes unsealed and the vacuum broken.

The foregoing are examples of the application of my invention to maintaining a substantially constant level of a liquid whose flow is utilized as the vacuum-creating agency. Fig. 4 shows a somewhat similar application in which, however, the liquid fluctuates between maximum and minimum levels as in a liquid trap or meter. Inflow to the tank 10 takes place through a pipe 11 under control of a valve 18, having a piston 61 which causes the valve to be held tightly to its seat by accumulated leakage pressure when said valve is closed. A stem 62 connected with the diaphragm 36 carries a pilot valve 25 and has a lost-motion connection with the valve 18, so that as the diaphragm rises, the main valve is first pressure-balanced and then lifted from its seat. 63 is a discharge-valve mechanism of similar character, but inverted and acting reciprocally with the inlet-valve mechanism. Two vent pipes 47 and 47$^a$, terminating at different levels in 10, are provided in connection with a pot 45 and water-leg pipe 35, 35$^a$. Vent pipe 47 contains a valve 64 connected by a rod 65 with the diaphragm 36 and adapted to be opened by the rise and closed by the descent of said diaphragm. Assuming the water level in tank 10 to be below the ends of both vent-pipes, the water-leg pressure under diaphragm 36 will overcome the atmospheric pressure (plus constant water-leg pressure in 66) acting above said diaphragm, and cause the opening of the inlet valve and the closure of the discharge-valve. Water-flow through the ejector 15, 16 entrains air and charges the tank. The sealing of vent-pipe 47$^a$ has no effect because pipe 47 still remains unsealed and valve 64 open, but as soon as 47 is sealed the vacuum in pot 45 causes the diaphragm 36 to descend, closing inlet valve 18 and opening discharge valve 63, this movement also closing valve 64. The tank 10 then discharges and the vacuum in 45 is maintained by the closure of valve 64 until vent-pipe 47$^a$ becomes unsealed, whereupon the valves are again reversed and the foregoing operation is repeated.

My invention further applies to situations where the vacuum-producing flow is that of a fluid different from the one whose level controls said flow, and in Figs. 5, 6, and 7, I have shown three different examples of such application.

In Fig. 5 the liquid in a closed tank 10$^a$ is maintained at a constant level by a controller 67 generally similar to the inlet controller of Fig. 4 (or it might be so maintained by any other suitable means). 68 is a steam coil adapted to heat the contents of 10$^a$, and having its inlet governed by a controller 69 similar in construction to those already described, and its outlet controlled by any suitable form of trap 70. 71 is a vessel forming a U with the vessel 10ª and containing atmospheric pressure. When the contents of 10ª are sufficiently heated to produce a vapor pressure which raises the liquid level in 71 to the end of vent-pipe 47, the controller 69 will shut off the supply of steam to the coil 68. Thus the tendency is to maintain the body of liquid in 10ª at a constant level and temperature.

In Fig. 6 the vacuum is induced in an ejector 15, 16 by gaseous flow through a pipe 72 which may have branches 73, 74 and a switching valve 75 such as would be applicable to a regenerative heating furnace, for example. An inlet controller 76 of the type already described controls the position of valve 75 through suitable connections 77, and also controls the admission of liquid to a tank 10 which acts as a sort of clock to time the reversals of valve 75, the tank being emptied through a pipe 78 and filled in a certain time through the pipe 11, valve 75 being shifted to the position shown in Fig. 6 when vent-pipe 47 becomes sealed. In cases like this where the sealing of the vent-pipe does not insure the retention of a vacuum on one side of the controller diaphragm I prefer to employ a check-valve such as 79 in the vacuum pipe 46, and may also employ a valve 80 operated by the diaphragm for preventing the loss of the vacuum in case the energizing flow through 72 should cease.

Fig. 7 represents a further application of my invention to a carbureter, where the vacuum-producing flow is that of the air ingredient of the mixture, and the controller operates to maintain a constant level of fuel adjacent to the fuel inlet to the mixing-chamber. 81 represents the mixing chamber fed by an air pipe 72, and 82 represents a liquid-fuel reservoir having an outlet to the mixing-chamber through a concentric passage 83 and spray holes 84. This reservoir is fed through a double stand-pipe and vent-tube 47ᵇ from a chamber 85 below the diaphragm 36, supplied with fuel from a pipe 11 under control of a valve 18 attached to the diaphragm. This pipe may contain a stop valve 86 interconnected with the mixture throttle-valve 87 and biased toward closure by a spring 88. A spring 89 normally tends to open the valve 18. The fuel level in reservoir 82 being below the end of vent-tube 47ᵇ, fuel descends in said tube from the chamber 85, and at the same time air is sucked by the ejector 15, 16 upwardly through tube 47ᵇ and downwardly through pipe 46, such air entering the reservoir through an atmospheric inlet 90. As soon as the vent-tube is sealed, a vacuum is produced through 46 in chamber 85, and diaphragm 36 is depressed by the atmospheric pressure above it, so as to close valve 18 and stop the flow of fuel until the vent-tube again becomes unsealed. A check-valve 79 and a diaphragm valve 80 serves to retain the vacuum in chamber 85 for a time in case the air flow through the mixing-chamber should cease. In connection with the foregoing features, any well-known or suitable means for maintaining the mixture-composition uniform under varying conditions may be employed.

I claim—

1. In differential septum apparatus, the combination of a movable septum, a chamber in operative relation thereto, an ejector communicating with said chamber and adapted by fluid entrainment to produce a vacuum therein, a valve controlled by said septum and normally biased to open but adapted to be closed by the operation of said ejector, and means for admitting aeriform fluid to said chamber to break the vacuum.

2. In differential septum apparatus, the combination of a movable septum, a chamber in operative relation thereto, an ejector communicating with and adapted by fluid entrainment to produce a vacuum in said chamber, means to supply an energizing fluid flow to said ejector, a vent conduit connected with said chamber, and a receptacle adapted to contain a fluctuating liquid for sealing and unsealing the inlet of said conduit.

3. In differential septum apparatus, the combination of a movable septum, a chamber in operative relation thereto, an ejector communicating with said chamber and adapted by fluid entrainment to produce a vacuum therein which unbalances the forces acting on the septum and causes movement of the latter, means for supplying a liquid to operate said ejector, and means for admitting aeriform fluid to said chamber to break the vacuum and rebalance the septum, thereby causing movement of the latter in the opposite direction.

4. In differential septum apparatus, the combination of a movable septum, a chamber in operative relation thereto and having an inlet for aeriform fluid provided with means for sealing and unsealing it, an ejector communicating with said chamber and adapted by fluid entrainment to produce a vacuum therein, and a valve controlled by said septum and normally biased to open but adapted to be closed by the operation of said ejector.

5. In differential septum apparatus, the combination of a movable septum, a chamber in operative relation thereto, an ejector communicating with, and adapted by fluid entrainment to produce a vacuum in said chamber, means to supply an energized liquid flow to said ejector, a valve controlled by the septum and controlling said flow, a receptacle for the liquid discharge through the ejector, and a vent-tube connected with said chamber and adapted to be sealed and unsealed by the liquid in said receptacle.

6. In differential septum apparatus, the combination of a movable septum exposed to atmospheric pressure on its outer side and biased to move against said pressure, a chamber in operative relation thereto, an ejector communicating with, and adapted to produce a vacuum in said chamber by entrainment of elastic fluid therefrom, means forming a vent to said chamber adapted to be closed and opened to make and break the vacuum, and a device actuated by said septum.

7. In differential septum apparatus, the combination of a movable septum, a chamber in operative relation thereto and having an inlet for aeriform fluid provided with means for sealing and unsealing it, an ejector communicating with said chamber for producing a vacuum therein, means for supplying liquid to operate said ejector, and a normally-open valve in the line of the liquid flow, controlled by said septum and adapted to be closed by the operation of said ejector.

8. In a tank-feeder, the combination of a tank open to the pressure of the atmosphere, means for supplying liquid thereto, an ejector energized by the liquid flow, a valve controlling said flow, a septum controlling said valve and having a chamber in operative relation thereto, communicating with, and adapted to be exhausted by the ejector, and a vent conduit adapted to be sealed and unsealed by the liquid in said tank for making and breaking the vacuum in said chamber.

9. In differential septum apparatus, the combination of a movable septum, a chamber in operative relation thereto, an ejector communicating with, and adapted to produce a vacuum in said chamber, means to supply an energizing liquid flow to the ejector, a receptacle for said liquid flow, a discharge pipe leading from the ejector to said receptacle and adapted to have its outlet immersed by the liquid therein, and means for venting said chamber by means of air passing upwardly through said discharge-pipe when the latter's outlet is uncovered.

10. In differential septum apparatus, the combination of a movable septum, a chamber in operative relation thereto, nozzles forming an ejector provided with a vacuum space which communicates with and is adapted to exhaust said chamber, a valve controlled by said septum and controlling the flow of the liquid for energizing the ejector, a liquid-discharge pipe surrounding said ejector, and a venting duct connecting the interior of said pipe with said vacuum space.

11. In differential septum apparatus, the combination of an ejector, a valve controlling the energizing fluid flow therefor, a septum controlling said valve, a chamber in operative relation thereto, communicating with, and adapted to be exhausted by the ejector, a vent for said chamber having controlling means for making and breaking the vacuum therein, and weighting means whose effect changes as the valve approaches its closed position, for biasing said septum in a direction to open the valve.

12. In differential septum apparatus, the combination of an ejector, a valve controlling the energizing fluid flow therefor, a septum controlling said valve and having a chamber in operative relation thereto, connected with and adapted to be exhausted by the ejector, said chamber communicating with a water-column pipe, a vent for said chamber having controlling means for making and breaking the vacuum therein, a mechanical weight applied to said septum and opposing the hydrostatic head of the water column, and a connection between said septum and weight for increasing the latter's effect and thus diminishing the weighting effect of the water column as the valve approaches its closed position.

13. In differential-septum apparatus, the combination of a controlling diaphragm, a chamber in operative relation thereto, a valve controlled by said diaphragm and controlling a fluid flow, a pipe adapted to sustain a water column between said chamber and diaphragm, and an ejector energized by the flow past said valve and controlling the pressure in said chamber.

14. In differential septum apparatus, the combination of a controlling diaphragm, a chamber in operative relation thereto, a pilot-valve controlled by said diaphragm, a pipe adapted to sustain a water column between said chamber and diaphragm tending to open said pilot-valve, a main valve, a septum actuated by fluid pressure to close said main valve when the pilot valve is closed, and an ejector controlling the pressure in said chamber.

In testimony whereof I have hereunto set my hand in the presence of two subscribing witnesses, this 1st day of December 1911.

EDWARD P. NOYES.

Witnesses:
 PETER W. PEZZETTI,
 E. BATCHELDER.